United States Patent [19]
Garrison

[11] Patent Number: 4,594,995
[45] Date of Patent: Jun. 17, 1986

[54] CARBONACEOUS SELECTIVE ABSORBER FOR SOLAR THERMAL ENERGY COLLECTION AND PROCESS FOR ITS FORMATION

[76] Inventor: John D. Garrison, 5607 Yerba Anita Dr., San Diego, Calif. 92115

[21] Appl. No.: 680,273

[22] Filed: Dec. 10, 1984

Related U.S. Application Data

[62] Division of Ser. No. 449,606, Dec. 14, 1982, abandoned.

[51] Int. Cl.⁴ .................................................. F24J 2/00
[52] U.S. Cl. ..................................... 126/417; 426/634; 427/255; 126/901
[58] Field of Search ................. 126/417, 901; 428/634; 427/160, 166, 223, 224, 225, 226, 227, 248.1, 251, 255

[56] References Cited

U.S. PATENT DOCUMENTS

| | | | |
|---|---|---|---|
| 4,055,165 | 10/1977 | Scragg et al. | 126/901 X |
| 4,098,956 | 7/1978 | Blickensderfer et al. | 428/627 |
| 4,122,239 | 10/1978 | Riboulet et al. | 126/901 X |
| 4,194,027 | 3/1980 | Adams et al. | 427/249 |

Primary Examiner—Larry Jones

[57] ABSTRACT

A selective absorber consisting of a number of thin layers on a supporting substrate, including (1) a carbonaceous layer, (2) a catalyst layer, and (3) a metallic infrared reflecting layer. The catalyst layer serving to catalyze the pyrolysis of a carbon containing gaseous compound or compounds to form the carbonaceous layer. Methods of production are described.

27 Claims, 8 Drawing Figures

CARBONACEOUS SELECTIVE ABSORBER FOR SOLAR THERMAL ENERGY COLLECTION AND PROCESS FOR ITS FORMATION

This is a division of application Ser. No. 449,606 filed Dec. 14, 1982, now abandoned.

BACKGROUND OF THE INVENTION

Field of the Invention

This invention relates to solar energy absorbing surfaces, and in particular to selective absorbers having high solar thermal conversion efficiency and low heat loss after collection. One of the most common and effective methods of utilizing solar energy is the process which converts the sun's radiation into heat by having it impinge on an absorbing surface. This particular invention concerns a new type of absorbing surface, which is particularly suited for use when the solar thermal energy collection is in vacuum at temperatures above 100° or 150° C. It also is suitable for lower temperature operation.

Solar energy is a diffuse energy source, such that, even on bright days, only about one kilowatt of energy is incident on a square meter of surface area facing the sun. Thus, rather large areas are required to collect sufficient energy for most applications. To compete favorably with other sources of energy, the cost per unit area must be low.

An important factor affecting both cost and performance of a solar thermal energy collector is its efficiency. High thermal conversion efficiency, and thus lower area and cost, is obtained by using an absorbing surface which is black to the sun's radiation. Solar radiation covers a range of wavelengths from about 0.3 to 2.0 microns.

Competing with this requirement of high solar thermal conversion efficiency is the requirement of low heat loss after collection. Since the operating temperature of most solar thermal collectors does not exceed a few hundred degrees Celsius, it is possible to develop a solar absorbing surface, which is also a low emittance surface, for the infrared radiation emitted at the operating temperature of the absorbing surface. The wavelength range for this radiation is largely above a few microns. Such an absorbing surface, which is absorptive to the sun, but reflective to infrared radiation, and thus has low infrared emittance, is called a selective absorber.

For an absorbing surface operating in vacuum, the only heat loss within the vacuum is due to infrared radiation. At operating temperatures above 100° or 150° C., this radiative loss can be very large, unless the surface emittance is made low. One of the exceedingly difficult tasks in the formation of a selective absorber, is to make the absorptance for solar radiation sufficiently high, while the infrared emittance is made quite low. The emittance apparently always increases, for a particular process of absorber formation, as the absorptance is increased. The selective absorber, whose invention is disclosed here, can be made to have particularly favorable values of solar absorption and infrared emission. Fixed (non-tracking) solar thermal energy collectors operating at elevated temperatures, of the order of 200° C. or above, must use vacuum and concentration, as well as high absorptance and low emittance for their absorbing surfaces, to achieve high collection efficiency. Collectors of this type have stagnation (no heat removal) temperatures which can exceed 400° or even 500° C. Such stagnation temperatures would occur, if pumping of the heat transfer fluid through the collector is interrupted for a sufficient length of time.

Numerous selective absorbers have been developed and used in the prior art for solar energy. Selective absorbers on metal substrates are most commonly obtained by electrodeposition of black chrome or black nickel on an infrared reflecting sublayer or substrate, or by the conversion of a metal coating or surface to a metal oxide on an infrared reflecting layer or substrate. Representative examples are found in U.S. Patents by Tabor, U.S. Pat. No. 2,917,817; Lowery, U.S. Pat. No. 3,920,413; McDonald, U.S. Pat. No. 4,055,707; and Roberts, et al, U.S. Pat. No. 4,104,134. Black chrome, apparently the best of these coatings for temperature operation below about 300° C., is a relatively expensive electroplated coating. Black chrome and black nickel are not stable at temperatures of the order of 350° C. or above in vacuum. Black nickel is not stable in air at even lower temperatures. The metal oxides are usually not stable at similar temperatures in vacuum, and may change their properties when heated in air. These oxide selective absorbers often have less desirable optical properties.

As currently known, the selective absorbers used for evacuated collectors are mostly vacuum evaporated or sputtered, usually onto a glass substrate. The details of forming vacuum evaporated interference coatings has been known for approximately twenty years.

The equipment for vacuum evaporation and sputtering is expensive and does not lend itself to mass production of selective absorbers. At this time, production consists of batch processing, and is limited to solar collector tube lengths of the order of one meter. Use of such short tube lengths greatly increases the manifold losses of an array of these collector tubes.

The formation of solid carbon from carbonaceous gases has been studied and used extensively. Such formation, when performed at elevated temperatures, by the decomposition of carbon containing gaseous compounds is termed pyrolytic carbon.

There are numerous U.S. Patents involving pyrolytic deposition of carbon on solid surfaces. Examples include Hobrock, U.S. Pat. No. 2,057,431 and Palumbo, U.S. Pat. No. 2,487,581, for making carbon resistors, Bokros, et al, U.S. Pat. No. 3,298,921, Goeddel, et al, U.S. Pat. No. 3,619,241, and Adams, et al, U.S. Pat. No. 4,194,027, for coating nuclear reactor fuel particles; Froberg, U.S. Pat. No. 3,944,686 for coating pyrolytic carbon on porous sheets of carbon material; and Batchelor, U.S. Pat. No. 3,317,338 for coating carbon on graphite rocket nozzles.

Nothing in the prior art teaches the pyrolytic deposition of carbon to form a selective absorber. Further, the carbon coatings formed for these other purposes are generally much thicker and of a different structure than those required for selective absorber formation, and these coatings are formed at a much higher temperatures than those generally contemplated for the invention disclosed here.

When studies of carbon formation on catalysts are made, invariably, the motivation is to understand the process and detect what is occurring, in order to learn how to eliminate or reduce the poisoning (reduced activity) of the catalyst caused by the carbonaceous layer. The carbonaceous layers and substrates would generally be completely unsuitable for use as selective absorbers. No efforts have been directed toward developing a thin carbonaceous coating on a metal catalyst for any purpose, prior to this invention.

A carbon coating for solar collectors has been developed by Googin, et al, U.S. Pat. No. 4,048,980, where carbon is mixed with a binder and painted or sprayed on a metal substrate for this coating. It has high emittance and would be completely unsuitable for use at higher operating temperatures. Peterson, in U.S. Pat. No. 4,065,593, teaches the use of carbon fibers for the absorption of solar radiation. These fibers do not exhibit selective absorption and are formed by an entirely different process than that used here.

Spielberg, in U.S. Pat. No. 3,968,786, teaches the use of a conductive carbonaceous pyropolymer for the absorption of solar radiation.

SUMMARY OF THE INVENTION

It is an object of this invention to provide a selective absorber of superior optical quality. It is also an object of this invention to provide a selective absorber which is inexpensive to produce, capable of being mass produced at or near atmospheric pressure. In addition, it is an object of this invention to provide a selective absorber which is stable at high temperatures in vacuum, even at temperatures above 500° C. It is further an object of this invention to provide a selective absorber which is suitable for, but not limited to, operation in solar thermal energy collectors which operate at temperatures above 100° or 150° C., and in which the selectivity absorbing surface is in vacuum. It is also an object of this invention to provide a selective absorber which is not limited to size by the cost of the fabricating apparatus.

The selective absorber comprises a supporting substrate, upon which is coated a thin metallic infrared reflecting layer, upon which is plated a thin metallic catalyst layer, and upon which is pyrolytically deposited a thin carbonaceous absorbing layer. The infrared reflecting layer may also serve as the supporting substrate. The surface of the infrared reflecting layer may also serve as the metallic catalyst, and the substrate may also serve as catalyst and infrared reflecting layer.

The absorbing layer is formed pyrolytically by contact of a carbon containing gas with the catalyst layer and forming a deposit thereon. The carbonaceous layers of this invention are typically formed in the temperature range from 250° to 550° C., but are not deemed limited to this range. The catalyst layer catalyzes the decomposition of the carbon containing gas, leading to the deposition of the carbonaceous layer. The process of catalytic deposition forms a very thin, selective carbonaceous absorption layer, on an infrared reflecting layer.

A BRIEF DESCRIPTION OF THE DRAWINGS

The following is a brief description of the accompanying drawings.

DETAILED DESCRIPTION OF THE DRAWINGS

Figure 1:
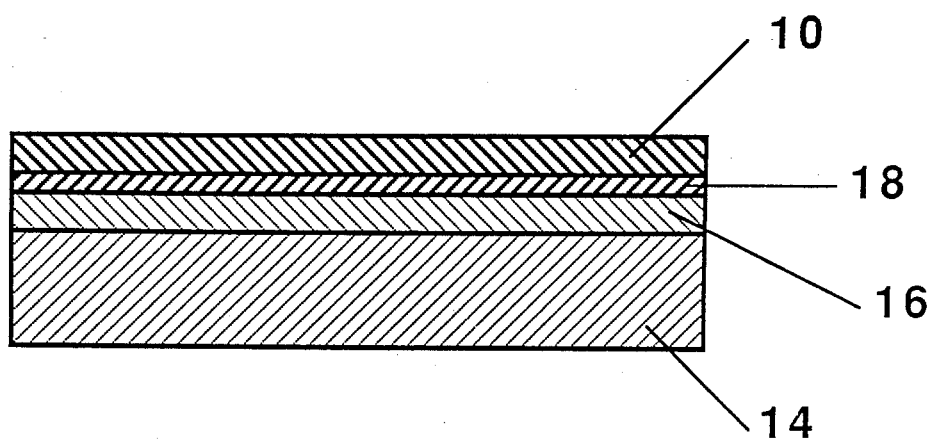
FIG. 1 is a cross section of a selective absorber stack comprising four separate and distinct materials for the substrate, infrared reflecting layer, catalyst layer and carbonaceous layer.

In describing a preferred embodiment of the invention illustrated in the drawings, specific terminology will be resorted to for the sake of clarity. However, the invention is not to be limited to the specific terms so selected, and it is to be understood that each specific term includes all technical equivalence which operate in a similar manner to accomplish a similar purpose.

This invention concerns a solar selective absorber coating which differs from currently available selective absorber coatings by the use of a carbonaceous absorbing layer deposited from a carbon containing gaseous compound or compounds at elevated temperature. Deposition is enhanced by the catalytic action of an active solid catalyst on the gas, such that the thin carbonaceous layer is uniformly deposited thereon. The catalyst layer apparently plays an essential role in giving the carbonaceous layer the excellent physical and optical properties which are possible with a selective absorber of this type.

With reference to the drawings, FIG. 1 shows the preferred embodiment of my invention being a four layer selective absorber stack which includes a substrate material 14 which is coated with an infrared reflecting layer material 16 upon which is plated a catalyst layer material 18 over which is pyrolytically deposited a carbonaceous layer 10.

Figure 2:
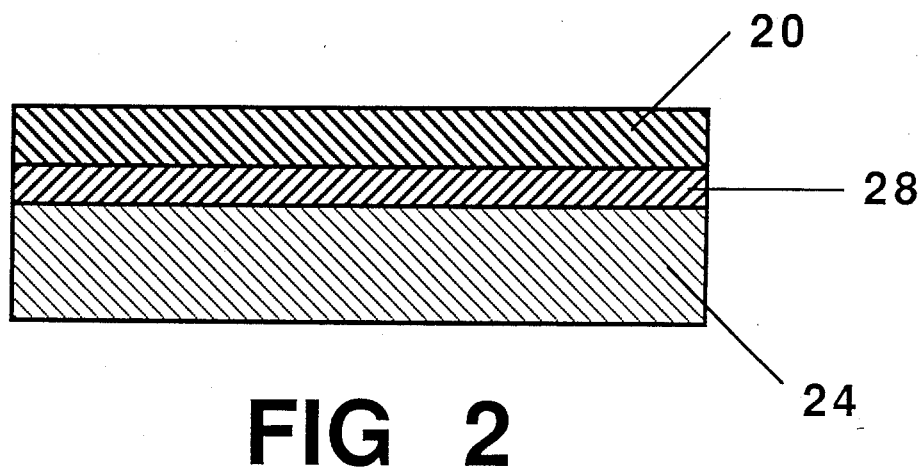
FIG. 2 is a cross section of a selective absorber stack in which the upper portion of the substrate material serves as the infrared reflecting layer.

FIG. 2 is a second embodiment of my invention where a pyrolytically deposited carbonaceous absorbing layer 20 is deposited over a catalyst layer material 28 which is plated over an infrared reflecting substrate material 24, the upper layer portion of this material serving as the infrared reflecting layer.

Figure 3:
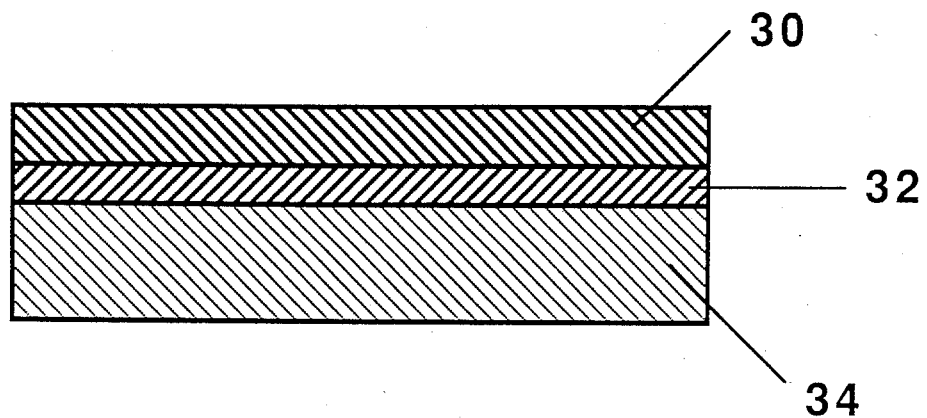
FIG. 3 is a cross section of a selective absorber stack in which the upper surface portion of the infrared reflecting layer material also serves as the catalyst layer.

FIG. 3 is a third embodiment of my invention showing the pyrolytically deposited carbonaceous layer 30 deposited over an infrared reflecting catalyst layer material 32 applied to a substrate 34. The main portion of infrared reflecting catalyst material 32 serves to reflect infrared radiation, while the upper surface portion serves as catalyst layer.

Figure 4:
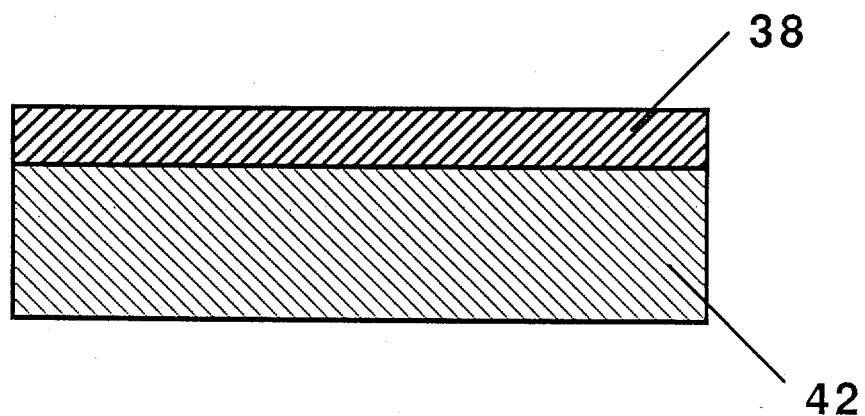
FIG. 4 is a cross section of a selective absorber stack in which the upper portion of the substrate material serves as an infrared reflecting layer and the upper surface portion of the infrared reflecting layer serves as the catalyst layer.

FIG. 4 is a fourth embodiment of my invention showing a carbonaceous layer 38 pyrolytically deposited over an infrared reflecting catalyst substrate material 42, the upper portion of this material serving as an infrared reflecting layer and catalyst layer, with the catalyst layer comprising the upper surface portion.

Figure 5:
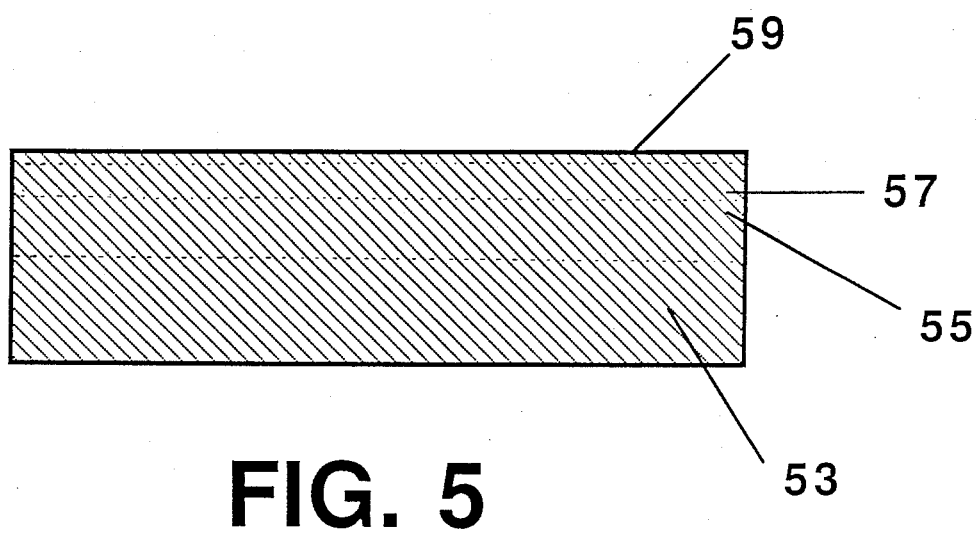
FIG. 5 is a cross section of the layering of the selective absorber stacks of FIGS. 1, 2, 3, and 4 into layer regions according to function.

The four embodiments of my invention shown in FIGS. 1, 2, 3, and 4 are layered structurally in a different manner. FIG. 5 shows that the four embodiments of FIGS. 1, 2, 3, and 4 are layered in the same manner functionally, each consisting of a substrate layer region 53, which provides structural strength and rigidity; a thin infrared reflecting layer region 55, where substantially all infrared radiation reflection occurs; a thin catalyst layer region 57, where the catalytic reactions leading to the deposit of the carbonaceous layer occurs; and a thin carbonaceous layer 59, which absorbs substantially solar radiation incident on the upper surface of my invention.

When the direction "up" or "upper" is used with respect to the embodiments of FIGS. 1, 2, 3, and 4, we will mean the direction towards the top to the figure. Similarly, "down" or "lower" will mean the direction towards the bottom of the figures.

DETAILED DESCRIPTION OF THE INVENTION

The substrate and Infrared Reflecting Layer

The infrared reflecting layer material and substrate material can include any of the materials and processes which have been found useful in other selective absorbers, but should not be deemed limited to these. These are generally standard materials and processes, which have many uses in addition to their use with particular selective absorbers. Typical, more common, substrate materials are glass, ceramic, steel, copper, stainless steel, iron, brass, and aluminum, but are not limited to these.

For lowest emissivity, said infrared reflecting layer material should be a noble metal, Cu, Ag, or Au, but should not be limited to these. Al also has a very low infrared emissivity. Ni has commonly been used for said infrared reflecting layer material, but its strong catalytic activity, its tendency to form a carbide, and/or diffusion of carbon through Ni apparently inhibits the formation of a carbonaceous layer with the correct properties on a Ni surface of sufficient thickness. The emissivity of Ni is also higher. Cost normally rules out the use of Au and may make Ag less attractive. Cost, ease of deposition, and other factors make Ag or Cu preferred. Ag and Cu do not readily form a carbide. The thickness of said infrared reflecting layer material is of the order of 0.05 microns or more.

The process of coating the metal infrared reflecting layer material on a different metal forming said substrate includes cleaning and preparing the substrate and then electroplating the infrared reflecting layer material on the substrate using standard procedures. Plating solutions and services are available commercially and are well known in the art.

Electropolishing of the substrate and/or the infrared reflecting layer material, using standard procedures and processes, can be performed to lower the surface emittance of the infrared reflecting layer. This may be useful for absorbers with a metal substrate.

If the substrate is a non-conducting material, such as glass, the infrared reflecting layer material must be deposited by techniques other than electroplating. Silver may be deposited, for example, using the two spray technique. Spray solutions and apparatus are well known and available commercially. Electroless copper can be deposited on glass, using standard processes, after activating the glass surface. A very thin, largely transparent, coating of spray silver also can serve to activate the surface prior to electroless copper plating. Solutions and services are available commercially.

Other standard methods of metal deposition of said infrared reflecting layer material are possible, such as flame spraying, and vacuum evaporation, etc.

The Catalyst

Typically, the catalyst material is a transition metal, but should not be deemed limited to these metals. Carbon formation is energetically favored on the surface of solids over carbon formation within the gas. In this context, all solids will then act as catalysts. Well known in the prior art are a large number of metals, combinations of metals, and non-metals which catalyze the deposition of a carbonaceous layer when acetylene is used as the carbonaceous gas. Many alloy films show catalytic activity. Although the catalytic activity of non-metals, particularly oxides have been widely studied, non-metals have hardly ever been used in the studies of catalysis, because of inferior activity compared to metals. Carbon apparently acts as a catalyst for its own deposition, though it is less active than certain catalysts. When forming the carbonaceous layer, the rate of formation apparently slows as the surface of the catalytic layer becomes covered. There is evidence that some of the metal catalyst mixes with said carbonaceous layer as it forms, to maintain the catalytic activity above that of pure carbon.

The transition metals are more active catalysts. Of these, the group VIII metals are the most active, with Fe, Co, and Ni, most commonly in use. Of the group VIII metals, the subgroup consisting of Ni, Pd and Pt are the most active. Cost may make Pd and Pt less attractive, although the amount of catalyst required is very small. Cu is a very active catalyst when acetylene is the carbon containing gas. Ni or Co appear to be the preferred catalysts. Ni and Co are low cost and easily plated. They can provide a plated layer with good uniformity and good microscopic coverage.

The activity of a catalyst is very strongly dependent upon surface structure in a way which is not yet well understood. Crystal faces and smooth surfaces are less active than surfaces involving more microscopic structure. Carbon seems to preferentially deposit at grain boundaries, dislocations, kinks and crystal steps, for example. Methods of applying the catalyst layer which enhance the surface activity, apparently enhance the formation of the selective absorber. The standard metal plating conditions used in industry seek plated layers which are microscopically smooth and metallic in appearance, and relatively thick. However, the plated catalyst layer preferred herein should be microscopically rough, dark, non-metallic in appearance and very thin. For example, Table 1 indicates typical ranges of plating variables for industrial catalyst material plating. The range of variables for plating of the catalyst layer, also shown in Table 1, are those typically required for forming a selective absorber on glass which has a microscopically smooth surface. The generally rougher surfaces of metal substrate samples do not seem to require quite as great a deviation from industrial plating conditions to form a suitable selective absorber. However, these metal substrate selective absorbers do not appear to achieve as good optical properties (absorption and emission) as the glass substrate selective absorbers.

TABLE 1
TYPICAL RANGE OF PLATING VARIABLES

| | J ma/cm$^2$ | Thickness microns | T °C. | C gm/l |
|---|---|---|---|---|
| Industrial | 20–300 | >0.1 | 25–75 | 90–600 |
| Catalyst | 0.5–10 | 0.01–0.1 | 0–30 | 3–50 |

Legend:
J = current density,
Thickness = thickness of plated layer,
T = plating solution temperature,
C = plating solution metal salt (Co and/or Ni) concentration.
Absorbers having an electroplated catalyst layer have been formed using a plating solution temperature range of 0 to 100° C. in a plating solution concentration range of 3 to 350 gm/l.

The structure of the catalytic surface depends strongly on the structure of the surface of the infrared reflecting layer. Electroplated layers tend to grow epitaxially and also follow the gross contours of the substate at first, before changing over to a surface characteristic of the plated metal and plating conditions. It appears that the best catalytic surface, in terms of the optical properties of the selective absorber formed, may be a surface which is plated on an infrared reflecting layer material which has a rather different crystalline structure, and in which the plating is for a short time with a solution which is relatively dilute. Appropriate plating times appear to be such that the catalyst starts to convert over to its own crystalline structure, but is only part way in the transition. The thickness of the plated catalyst layer is typically about 0.01 microns, as estimated by plating conditions. The thickness of the plated catalyst layer is set to optimize the absorptance and emittance. Greater thicknesses tend to lead either to optically poor carbonaceous layers or no carbonaceous layer. For glass substrates, preferred plating solutions are usually roughly one-tenth or less of the normal plating concentration. Metal substrates have microscopically and often macroscopically rougher surfaces. The catalyst surface usually appears to be more active, because of this roughness.

An example can serve to indicate how sensitive the results are to the nature of the catalytic surface. Two rolled copper samples with nickel catalyst, prepared in identical fashion, were both exposed to acetylene at atmospheric pressure and 450° C. However, one sample was exposed to natural gas at 450° C. (with no formation of a carbonaceous layer) prior to exposure to acetylene. After exposure to the acetylene, one developed a carbonaceous coating, the other was metallic gray. The air-mass-two solar sprectrum absorption coefficients for these two samples differed by about twenty percent (20%). The marked difference must be attributed to the chemical and physical action of the heat and/or natural gas in changing the catalytic surface of the one sample.

The Carbonaceous Absorbing Layer and Gas

The carbonaceous absorbing layer is formed by catalytic action of the catalyst layer on a carbon containing compound or compounds in gaseous or vapor phase at elevated temperature. Typically, the temperature is from about 250° to about 550° C., but should not be deemed limited to this range. A selective absorber can be formed very slowly near room temperature (weeks) using nickel as a catalyst and acetylene as the carbon containing gas, for example. The prior art shows that pyrolytic carbon coatings are formed at temperatures from 800° to 2400° C. It is not clear whether suitable selective absorbers can be fabricated at these high temperatures. It appears that control of their formation would be more difficult. The structure of said carbonaceous layer could be very different and unsatisfactory. Fabrication at lower temperatures reduces the cost in terms of both energy and equipment for processing.

The carbon containing gases which make selective absorbers include acetylene, ethylene, Mapp gas (a commercial welding gas containing mainly methylacetylene and propadiene), butane, propane, and mixtures of these gases. Evidently, conversion of all hydrocarbons into carbon and hydrogen is energetically favored. In addition, the type of carbon formed can be essentially the same when obtained from many different carbon containing gases. However, the formation of selective absorbers from the various gases is not equally easy, nor are the absorber surfaces equally satisfactory. Acetylene is the least stable of the common gases, and apparently, selective absorbers can be made at lower temperatures or in shorter times with acetylene than with the other common gases. In a limited test, glass substrate samples with silver infrared reflecting layer and nickel catalyst were formed using four different gases, acetylene, Mapp gas, ethylene, and converted natural gas (made by passing natural gas through a chamber at about 1000° C. in the presence of nickel before entering the oven for sample formation). The optical properties of the samples were optimized by varying the plating time and current density, and the baking time and temperature (475° and 535° C.). The samples with the best optical properties were those formed with acetylene. These also required noticeably lower Plating times.

The thickness of the carbonaceous layer is probably of the order of 0.01 to 0.1 micron, but has not been measured. Its thickness and properties are adjusted to yield optimum absorptance and emittance for the specified solar collector operating temperature and design. The particular values of absorptance and emittance are determined by the gas pressure, temperature and deposition time, for a particular carbon containing gas and catalytic surface. The nature of said catalytic surface and the type of gas play a crucial role in absorber formation. Normally, the pressure should be set at or near atmospheric pressure, to reduce fabrication cost, but should not be deemed limited to such pressure. Good selective absorbers have been made at pressures appreciably less than one atmosphere. Most good selective absorbers have been made in the temperature range from about 420° to 535° C., using acetylene. Conditions for forming particular selective absorber samples are given as examples below. A suitable selective absorber should have its absorptance in the range from 0.75 to 1.00 and its emittance in the range 0.25 to 0.00. However, if the absorptance is in the lower end of its suitable range, room temperature emittance should be less than about 0.07, while if the emittance is in the upper end of its range, the absorptance should be greater than about 0.90. Good selective absorbers have optical properties appreciably better than these limits, as indicated below.

Figure 6:
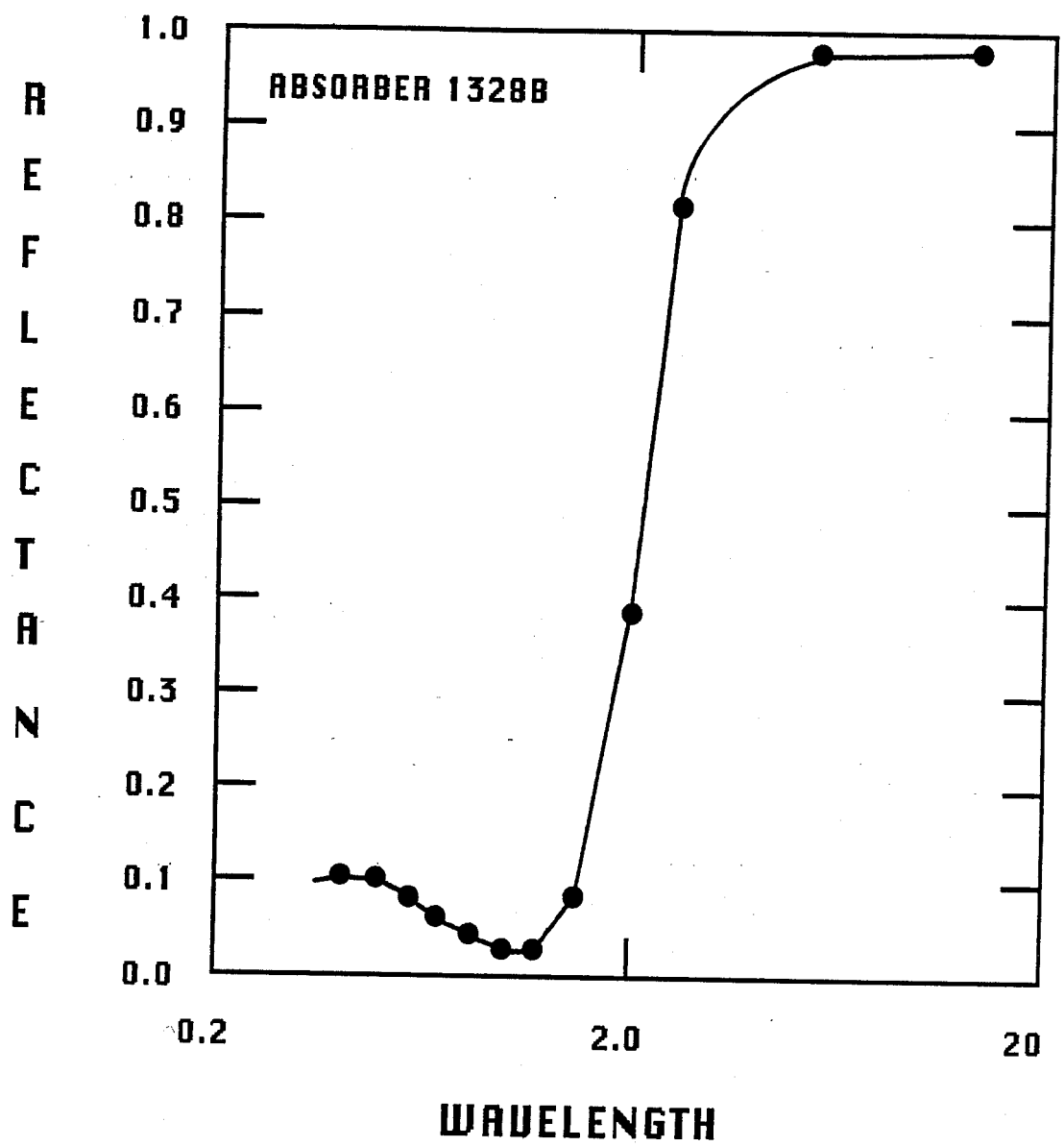
FIG. 6 is a graphical representation of the reflectance of one sample as a function of wavelength.

All selective absorber samples described herein can be characterized optically as a thin absorbing layer on a reflecting layer of high infrared and rather high visible reflectance. There are two effects, reflection of the light from the two surfaces, and absorption of light within the absorbing layer. The amount of light reflected from the top surface of the absorbing layer is reduced by the diffuseness of the surface (a graded density and thus a graded refractive index). The object is to make both of these reflections small, about equal in magnitude, and adjust the absorbing thickness so first order destructive interference occurs in the near infrared region. Note that if too much absorption occurs within the absorbing layer at wavelengths of the solar spectum, the emittance tends to become too high for a collector operating near 200° C. or above. Typically, for operation at these higher temperatures, one wishes the absorptance to start to drop somewhat above a wavelength of one micron, and drop rapidly between 1.5 and 2.5 microns to a value below 0.2 at 2.5 microns. The wavelength of the interference minimum should usually be near one micron FIG. 6 illustrates these properties of a very good sample.

The carbon deposition time when making sample absorbers is determined by trained observation of the darkness and color of the sample. Typically, a sample may initially become brownish in hue as the carbonaceous layer forms. This corresponds to more absorption in the blue region. As the thickness of the carbonaceous layer increases, and absorption increases, the sample will darken and perhaps turn a magenta color, indicating an interference in the green-yellow-orange and more visible reflection in the blue and red. As said carbonaceous layer further increases in thickness, the interference minimum will shift into the red, giving the sample a deep blue color. Not long after this a good sample will appear very dark and approximately colorless. At about this time, or shortly thereafter, the sample should be removed from the oven, depending upon where the interference minimum is to be located. The interference minimum continues to shift into the near infrared as said carbonaceous layer increases in optical thickness, but much more slowly. When the sample turns blue, if it is too light a blue, this indicates that there is insufficient absorption within the carbonaceous layer, and usually too much reflection from both the carbonaceous layer and the infrared reflecting layer. Shiny samples usually have the top surface of the carbonaceous layer insufficiently diffuse, which usually indicates that the plating time for the catalyst has been too long. A gray sample indicates uniform absorption throughout the visible wavelengths, and usually indicates that the emittance is too high.

Selective Absorber Formation

Approximately 1500 selective absorber samples have been made in an attempt to determine the conditions and materials most suitable for the formation of this type of selective absorber. There are many variables involved in the process. The optical properties of the selective absorber are sensitive to changes in certain of these variables. The variables include: the substrate material, the infrared reflecting layer material, the catalyst material, the nature of the internal structure and surfaces of these materials, and their thickness, the carbon containing gas and its pressure, the temperatures of the materials and the carbon containing gas during the formation of the carbonaceous layer, and the time of formation of the carbonaceous layer. The surface of the substrate affects the structural and surface characteristics of the successive layers placed on this surface. The internal structure and surface properties of plated layers depend very strongly on the plating conditions, which include the chemical constituents of the plating solution and their concentrations, the plating temperature and time, and the current density (for electroplating). Even gravity can have an effect. For example, there is a small difference in the nature of silver deposited on top and bottom sides of glass samples when silvered by the Brashear method in a tray, which is at least partly a gravitational effect. Gravity can affect the solution concentration and temperature from top to bottom when electroplating, if the solution is not well stirred, while turbulence in stirring can affect the uniformity of plating adversely. A drop of plating solution placed on the surface to be plated prior to plating will show as a spot with slightly different optical properties on the finished absorber.

Except for demonstration purposes, the carbon containing gas has been limited herein to acetylene at close to atmospheric pressure. The catalyst layer has been mostly nickel or cobalt, plated from relatively dilute nickel chloride or cobalt chloride solutions near room temperature or below. The chloride solutions seem to have better throwing power (uniform plating characteristics) than other salts of Co and Ni. Plating from dilute solutions provides nickel or cobalt of a gray-brown or black, rather than metallic appearance. This form appears to be a more active catalyst, or at least apparently gives selective absorber samples with better optical properties. There are rather large variations in the nature of the plating, depending on the plating current density, time and temperature.

In plating the catalyst material of the samples, current densities are varied to optimize the optical properties of the samples. Current densities in the range from about 0.3 to 25 ma/cm$^2$ have been tried with the more common current densities around 1 to 10 ma/cm$^2$.

Catalyst material plating times are sufficient to cover said infrared reflecting layer, but are not times much longer than this. Typically, integrated current densities of the order of 0.02 Coulombs/cm$^2$ have been used. The current density, plating time, plating solution, and plating temperature are all important variables.

The temperature for deposition of the carbonaceous layer usually has been set to achieve deposition times in the range from about one to five minutes with the sample and its holder at room temperature, prior to insertion in the oven. Sample formation has involved oven temperatures from about 250° to 550° C. When using acetylene and Mapp gas (and some others) it appears desirable to have the oven temperature below about 500° C. to avoid excessive deposition of condensable compounds on the cooler walls of the oven. These compounds are formed by the decomposition of the acetylene or Mapp gas. The nature of the walls of the oven, sample holder and sample all affect the nature of this decomposition.

PRESENTATION OF EXAMPLES

With each example certain parameters are specified concerning formation of the example. A final optimization process might follow, in setting up production with a particular set of equipment. In such a final optimization process, the walls of the oven and their coating and steady state gas flow rates through the oven should be considered as variables in the optimization process. The more promising of the types of absorbers presented in these examples are further optimized below.

EXAMPLE 1

A 2.5 cm × 15.2 cm 0.32 cm soda lime glass substrate is coated with silver using the Brashear process to form the infrared reflecting layer. A dilute plating solution containing 30 gm/l nickel chloride is used to plate on said catalyst layer. Plating conditions are: current density 2.5 ma/cm$^2$, plating time 10 sec, solution temperature 24° C. Part of this sample, 2.5 cm×3.8 cm×0.32 cm, at room temperature, is inserted into acetylene having a pressure of 0.8 atmospheres and a temperature of 425° C. for eight minutes. The measured normal reflectance of this sample as a function of the wavelength is:

Wavelength (microns): 0.42; 0.50; 0.60; 0.85; 1.20; 2.50; 5.00; 12.00.
Normal Reflectance: 0.12; 0.12; 0.12; 0.07; 0.04; 0.82; 0.97; 0.97.

Comments: The properties of the coating are not expected to be very different using one atmosphere pressure for the acetylene. Samples of this type have been made subsequently which have better optical properties (see below).

EXAMPLE 2

The surface of a 2.5 cm×15.2 cm×0.32 cm soda lime glass substrate is activated with a thin silver coating using the Brashear process and then coated with copper in a solution consisting of 4 gm/l $CuSO_4$, 6 gm/l NaOH, 15 gm/l sodium potassium tartrate, and 100 cc/l formaldehyde, at a temperature of 30° C. This electroless copper coating is plated with 1 ma/cm$^2$ of copper for 15 sec from an alkaline copper solution consisting of 7 gm/l copper carbonate, 100 gm/l potassium bitartrate and 15 gm/l potassium carbonate at room temperature (21° C.). A nickel catalyst is plated on the copper with a current density of 2.5 ma/cm$^2$ for 13 sec from a plating solution consisting of 19 gm/l boric acid, 74 gm/l nickel sulfate, 148 gm/l nickel chloride, and 74 gm/l magnesium sulfate at a temperature of 20° C. This room temperature sample is inserted into acetylene at a pressure of 0.8 atmosphere and a temperature of 390° C. for 11 minutes. The measured normal reflectance of the sample is:

Wavelength (microns): 0.42; 0.50; 0.60; 0.85; 1.20; 2.50; 5.00; 12.00.
Normal Reflectance: 0.14; 0.11; 0.08; 0.14; 0.35; 0.86; 0.96; 0.97.

Comments: The step of alkaline copper plating can be omitted. The nickel plating solution is not as dilute as used in later samples of this type. The catalytic surface still appears to be rather active. This may be because of the alkaline copper is not as smooth a surface as the electroless surface alone. Later samples omit the copper electoplating and use a more dilute nickel plating solution.

EXAMPLE 3

A glass substrate with silver for the infrared reflecting layer, prepared as in Example 1 is plated from the nickel plating solution of Example 1 at a temperature of 24° C. with a current density of 0.25 ma/cm$^2$ for 50 sec. The room temperature sample is inserted in Mapp gas at a temperature of 500° C. for 12 minutes. The measured normal reflectance of this sample is:

Wavelength (microns): 0.42; 0.50; 0.60; 0.85; 1.20; 2.50; 5.00; 12.00.
Normal Reflectance: 0.10; 0.08; 0.07; 0.10; 0.18; 0.65; 0.82; 0.91.

Comments: Pyrolysis of the Mapp gas at this temperature causes the formation of some liquid condensate on the parts of the glass oven chamber outside the tube oven. Note that nickel plating on silver at 0.6 ma/cm$^2$ for 25 sec at 27° C. using the solution of Example 2 does not lead to the deposition of said carbonaceous layer within a reasonable time in Mapp gas at 510° C. (for example).

EXAMPLE 4

A 2.5 cm×15.2 cm×0.32 cm soda lime glass substrate is sand blasted, heated to a temperature of approximately 200° C., flame sprayed with aluminum (thickness about 0.005 cm), and then copper (thickness about 0.014 cm), to form the infrared reflecting layer. A current density of 12 ma/cm$^2$ is applied for 6 seconds using a nickel plating solution at 27° C. containing 100 gm/l of nickel chloride. The room temperature sample is inserted into acetylene with a pressure of 0.5 atmosphere and a temperature of 460° C. for 3.5 minutes. The measured normal reflectance is:

Wavelength (microns): 0.45; 0.55; 0.67; 0.85; 1.00; 1.20; 2.00; 2.50.
Normal Reflectance: 0.04; 0.05; 0.06; 0.10; 0.17; 0.22; 0.33; 0.35.

Comments: The absorptance drops off too slowly above one micron to have a sufficiently low emittance for high temperature solar collector operation (unmeasured above 2.5 microns). The high emittance must be at least partly due to the roughness of the surface and to the impurity of the flame sprayed copper. It appears that the plating solution is not as dilute as would be required for a very smooth infrared surface. It also appears that flame spraying onto glass does not provide a coating which has sufficient bond to the glass to be durable. However, flame sparying onto a metal substrate has a good bond. Flame sprayed aluminum has better bonding than flame sprayed copper on glass.

EXAMPLE 5

This sample is treated exactly as Example 4 except there is no nickel plate. The copper serves as the catalyst, and the time in the acetylene is somewhat longer, 4.2 minutes. The measured normal reflectance is:

Wavelength (microns): 0.45; 0.55; 0.67; 0.85; 1.00; 1.20; 2.00; 2.50.
Normal Reflectance: 0.06; 0.06; 0.09; 0.15; 0.25; 0.35; 0.61; 0.68.

Comments: The absorptance of this example starts dropping too soon with increasing wavelength, yet is not low enough at 2.5 microns to have low emittance. This seems to be characteristic of the copper catalyst-infrared reflecting layer.

EXAMPLE 6

A 2.5 cm×3.5 cm×0.15 cm aluminum substrate is zincated and immersion plated with a nickel catalyst. Zincating consists of immersion of the sample for 1.5 minutes in a solution consisting of 450 gm/l sodium hydroxide and 90 gm/l zinc oxide at room temperature. Nickel plating consists of immersion for 3 minutes in a solution consisting of 16 gm/l boric acid and 190 gm/l nickel chloride at room temperature. This room temperature sample was inserted in acetylene at a temperature of 510° C. for 85 seconds. The measured normal reflectance is:

Wavelength (microns): 0.42; 0.50; 0.60; 0.72; 0.85; 1.00; 1.50; 2.50.
Normal Reflectance: 0.05; 0.05; 0.05; 0.07; 0.10; 0.16; 0.34; 0.60.

Comments: The emittance of this example would probably be improved if it is electropolished prior to zincating. The manufacture of the aluminum sheet leaves fine striations in its surface.

EXAMPLE 7

A 2.5 cm×2/5 cm×0.08 cm rolled copper sample is polished with jewelers rouge, etched in a 50% solution of nitric acid for about 10 seconds and plated with a nickel catalyst using the nickel plating solution of Example 6. A current density of 2.5 ma/cm$^2$ is applied for 14 seconds with a solution temperature of 24° C. The room temperature sample is inserted in 0.9 atmosphere of acetylene at 450° C. for 4.4 minutes. The measured normal reflectance is:

Wavelength (microns): 0.42; 0.50; 0.60; 0.72; 0.85; 1.00; 1.50; 2.50.

Normal Reflectance: 0.08; 0.08; 0.08; 0.08; 0.09; 0.13; 0.29; 0.64.

Comments: The metal substrate samples seem to have microscopically rougher surface leading to generally higher emittances and often higher absorptances than the glass substrate samples. This also allows use of a less dilute plating solution. Acid etching of a metal substrate cleans the surface and makes it more uniform, leading to more uniform optical properties of the selective absorber.

EXAMPLE 8

A 2.5 cm×2.5 cm×0.08 cm rolled copper sample is electropolished in an 85% phosphoric acid solution using a current density of 300 ma/cm$^2$ for 4 minutes at a temperature of 75° C. It is then plated with a nickel catalyst using the plating solution of Example 1. Plating conditions are: 13 ma/cm$^2$ for 15 seconds at 18° C. The room temperature sample is inserted into two-thirds atmosphere of ethylene at 535° C. for 135 seconds. The measured normal reflectance is:

Wavelength (microns): 0.42; 0.50; 0.60; 0.72; 0.85; 1.00; 1.50; 2.50.

Normal Reflectance: 0.07; 0.08; 0.08; 0.08; 0.08; 0.09; 0.13; 0.08.

Comments: The emittance of this sample will be too high. No measurements have been made beyond 2.5 microns.

EXAMPLE 9

A 2.5 cm×2.5 cm×0.08 cm rolled copper sample is etched in a 50% solution of nitric acid for about 12 seconds. It is plated with palladium by immersion for 30 seconds in a bath consisting of 6 drops of palladium chloride solution in 75 cc of water. The room temperature sample is inserted in two-thirds atmosphere of acetylene at 420° C. for 230 seconds. The measured normal reflectance is:

Wavelength (microns): 0.42; 0.50; 0.60; 0.75; 1.00; 1.50; 2.50.

Normal Reflectance: 0.06; 0.06; 0.06; 0.09; 0.25; 0.70; 0.85.

Comments: Palladium is expensive; however, the amount of palladium required for a catalyst is very small. A similar copper substrate sample, immersion plated with platinum, had less satisfactory optical properties, with a lower absorptance.

EXAMPLE 10

A 2.5 cm×2.5 cm×0.08 cm rolled copper sample is brightened with a 10% nitric acid solution. The room temperature sample is inserted in 0.9 atmosphere of acetylene at 535° C. for 1.5 minutes. The measured normal reflectance is:

Wavelength (microns): 0.45; 0.55; 0.65; 0.75; 0.85; 1.00; 1.50; 2.50.

Normal Reflectance: 0.09; 0.09; 0.10; 0.13; 0.18; 0.34; 0.64; 0.91.

Comments: As with all samples with copper catalyst-infrared reflecting layers we have made, the reflectivity starts to increase at too low a wavelength and then increases too slowly above one micron. This is a suitable method for applying a relatively inert black coating on copper for decorative or protective purposes. Thicker coatings can be obtained by exposure for longer duration in acetylene.

EXAMPLE 11

A 2.5 cm×3.5 cm×0.15 cm rolled aluminum sample is zincated using the solution of Example 6. The catalyst layer is palladium, obtained by immersion plating using the solution of Example 9. The room temperature sample is inserted in two-thirds atmosphere of acetylene at 400° C. for 500 seconds. The measured normal reflectance is:

Wavelength (microns): 0.45; 0.55; 0.65; 0.75; 0.85; 1.00; 1.50; 2.50.

Normal Reflectance: 0.04; 0.05; 0.08; 0.12; 0.20; 0.42; 0.71; 0.87.

Comments: The reflectance of this sample rises too soon with increasing wavelength to have high solar absorptance. Electropolishing the aluminum prior to zincating may help the selectivity of this example.

EXAMPLE 12

A 2.5 cm×3.5 cm×0.08 cm rolled copper sample is etched in 50% nitric acid solution for 10 seconds. The catalyst layer is plated from the nickel solution of Example 1 at a current density of 13 ma/cm$^2$ for 14 seconds. It is inserted in 0.8 atmospheres of Mapp gas at 495° C. for 190 seconds. The measured normal reflectance is:

Wavelength (microns): 0.45; 0.55; 0.65; 0.75; 0.85; 1.00; 1.50; 2.50.

Normal Reflectance: 0.12; 0.12; 0.08; 0.05; 0.06; 0.12; 0.50; 0.85.

EXAMPLE 13

A 2.5 cm×3.5 cm×0.08 cm rolled copper sample is etched in a 50% nitric acid solution for 10 seconds. The catalyst layer is plated from a cobalt-nickel solution consisting of 29 gm/l cobalt sulfate, 300 gm/l nickel sulfate, 50 gm/l boric acid, with sulphuric acid added to set pH at 4.4. The plating conditions are: current density 6 ma/cm$^2$ for 2.2 seconds and a solution temperature of 43° C. The room temperature sample is inserted in two-thirds atmosphere of acetylene at 460° C. for 17 minutes. The measured normal reflectance is:

Wavelength (microns): 0.45; 0.55; 0.65; 0.75; 0.85; 1.00; 1.50; 2.50.

Normal reflectance: 0.07; 0.08; 0.08; 0.09; 0.09; 0.09; 0.11; 0.16.

Comments: The emittance of this sample will be too high. This again demonstrates that a microscopically rough infrared reflecting layer does not require a dilute plating solution to obtain a high absorptance.

EXAMPLE 14

A 2.5 cm×3.5 cm×0.08 cm rolled copper sample is etched for 10 seconds in a 50% nitric acid solution. The nickel catalyst layer is plated from the nickel solution of Example 1 at a solution temperature of 26° C. with a current density of 14 ma/cm² for 12 seconds. The room temperature sample is inserted in 0.9 atmospheres of butene at 555° C. for 107 seconds. The normal reflectance is:

Wavelength (microns): 0.45; 0.55; 0.65; 0.75; 0.85; 1.00; 1.50; 2.50.

Normal Reflectance: 0.11; 0.07; 0.07; 0.07; 0.08; 0.14; 0.33; 0.72.

Comments: It is harder to form good selective absorbers with butene, even at this higher temperature. This sample is not very uniform, and appears to have a higher emittance than good samples.

EXAMPLE 15

A 2.5 cm × 3.5 cm × 0.08 cm rolled copper sample is etched for 10 seconds in 50% nitric acid solution. The catalyst layer is plated from a solution containing 100 gm/l nickel chloride at a temperature of 21° C. with a current density of 14 ma/cm² for 10 seconds. The room temperature sample is inserted into 0.9 atmosphere of 2-butene (cis and trans) at a temperature of 535° C. for 255 seconds. The measured normal reflectance is:

Wavelength (microns): 0.45; 0.55; 0.65; 0.75; 0.85; 1.00; 1.50; 2.50.

Normal Reflectance: 0.15; 0.15; 0.16; 0.16; 0.14; 0.11; 0.08; 0.60.

Comments: This sample also is not too uniform, and the emittance is expected to be too high. The sample has not been measured above 2.5 microns.

EXAMPLE 16

A 2.5 cm × 2.5 cm × 0.08 cm rolled copper sample is etched in 50% nitric acid solution for 10 seconds. The catalyst layer is plated from the solution of Example 1 at a temperature of 24° C. with 60 ma/cm² for 1.2 seconds. The room temperature sample is inserted in two-thirds atmosphere of the carbon containing gas at 510° C. for 260 seconds. The carbon containing gas is obtained by passing natural gas through a quartz reaction chamber at about 1000° C. The reaction chamber contains a small copper sheet and a small nickel plated copper sheet to catalyze the decomposition of the natural gas into gases which more readily form said carbonaceous layer. The measured normal reflectance is:

Wavelength (microns): 0.45; 0.55; 0.65; 0.75; 0.85; 1.00; 1.50; 2.50.

Normal Reflectance: 0.08; 0.07; 0.08; 0.09; 0.12; 0.15; 0.17; 0.09.

Comments: This indicates that a more readily available source of said carbon containing gas may be used to obtain said carbonaceous layer. There was no success in obtaining the carbonaceous layer using natural gas directly. The emittance of this sample is too high. In all attempts to make selective aborber samples using converted natural gas (about 50 samples), no samples have had as good optical porperties as the better samples made with acetylene.

EXAMPLE 17

The sample is a 2.5 cm × 2.5 cm × 0.08 cm rolled copper brightened in 10% nitric acid solution. The catalyst layer is plated from a solution containing 96 gm/l cobalt chloride at 28° C. with 2.7 ma/cm² for 10 seconds. The room temperature sample is inserted in 0.9 atmospheres of acetylene at 535° C. for 92 seconds. The measured normal reflectance is:

Wavelength (microns): 0.45; 0.55; 0.65; 0.75; 0.85; 1.00; 1.50; 2.50.

Normal Reflectance: 0.06; 0.06; 0.07; 0.08; 0.10; 0.16; 0.39; 0.62.

Comments: Cobalt seems to make a better catalyst on a copper infrared reflector than nickel. This sample appears to be somewhat darker than the nickel catalyst on copper samples above. However, the plating solution is not very dilute. This effect has not been studied for metal substrate samples, as it has for glass substrate samples discussed below.

EXAMPLE 18

A 2.5 cm × 2.5 cm × 0.08 cm rolled copper sample is etched in 50% nitric acid solution, polished with jeweler's rouge, rinsed and brightened in 10% nitric acid solution. The iron catalyst layer is plated from a solution of 40 gm/l ferrous chloride at a temperature of 25° C. with 62 ma/cm² current density for about 0.5 seconds. The room temperature sample is inserted in 0.9 atmosphere of acetylene at 510° C. for 260 seconds. The measured normal reflectance is:

Wavelength (microns): 0.45; 0.55; 0.65; 0.75; 0.85; 1.00; 1.50; 2.50.

Normal Reflectance: 0.10; 0.09; 0.10; 0.13; 0.18; 0.30; 0.60; 0.83.

Comments: The tendency of iron solutions to rust makes them less desirable. Iron is also a less active catalyst than nickel and cobalt, for example. The carbonaceous layer is less uniform. The solar absorptance of this sample is too low.

EXAMPLE 19

A 2.5 cm × 2.5 cm × 0.06 cm rolled stainless steel sample is plated with copper for one minute using a current density of 8 ma/cm² and a cyanide copper strike solution at 60° C. This is followed by plating with a current density of 8 ma/cm² for 5 minutes using a high efficiency cyanide copper solution at 60° C. The copper strike solution consists of 15 gm/l CuCN, 23 gm/l NaCN and 15 gm/l sodium carbonate. The high efficiency solution consists of 75 gm/l CuCN, 95 gm/l NaCN, 30 gm/l NaOH and 42 gm/l KOH. The room temperature sample is inserted in 0.9 atmosphere of acetylene at 470° C. for 3 minutes. The measured reflectance is:

Wavelength (microns): 0.45; 0.55; 0.65; 0.75; 0.85; 1.00; 1.50; 2.50.

Normal Reflectance: 0.07; 0.07; 0.07; 0.07; 0.08; 0.17; 0.43; 0.68.

Room temperature emittance=0.35

Comments: The emittance is too high. Only a few samples of this type have been formed. None, as yet, have very good optical properties.

EXAMPLE 20

A 2.5 cm × 2.8 cm × 0.08 cm rolled copper sheet is etched in a 50% nitric acid solution for 10 seconds and plated with a solution containing 33 gm/l nickel chloride. The plating conditions are: current density 14 ma/cm², plating time 12 seconds, and plating temperature 26° C. This room temperature sample is inserted in butane at 555° C. for 107 seconds. The measured normal reflectance is:

Wavelength (microns): 0.45; 0.55; 0.65; 0.75; 0.85; 1.00; 1.20.

Normal Reflectance: 0.12; 0.08; 0.07; 0.07; 0.08; 0.11; 0.21.

Comments: The carbonaceous layer is not very uniform. This sample was not measured above 1.20 microns.

EXAMPLE 21

A 2.4 cm×15.2 cm×0.2 cm glass sheet is sprayed on one side by the two spray method to coat it with said infrared layer of silver. A 2.4 cm×3.5 cm×0.2 cm piece of this sheet is plated with said catalyst layer of cobalt. The plating conditions were: plating solution with 18 gm/l of $CoCl_2$ at 24° C., current density of 1.55 ma/cm$^2$ and a plating time of 30 seconds. The room temperature sample was inserted in acetylene at 535° C. for 265 seconds. The measured normal reflectances are:
Wavelength (microns): 0.42; 0.50; 0.60; 0.85; 1.00; 1.20; 2.50; 12.0.
Normal Reflectance: 0.08; 0.08; 0.08; 0.09; 0.12; 0.18; 0.78; 0.98.

Comments: It appears that a cobalt catalyst on silver infrared reflector will never yield as good optical properties for the selective absorber as nickel on silver or cobalt on copper for the glass substrate samples. Attempts to form a selective absorber by the above conditions, except for, either increasing the plating solution temperature to 38° C., or increasing the current density to 4 ma/cm$^2$, have failed. No observable carbonaceous layer is formed on exposure to acetylene for reasonable lengths of time, with these changed conditions. For the example above, the catalyst layer is dark and not metallic in appearance, while the changes in solution temperature or current density led to an off-white color for the coating (probably metallic, but rough in texture).

EXAMPLE 22

A 2.4 cm×15.2 cm×0.2 cm glass sheet is silvered in a tray. This glass sheet is inserted in an electroless nickel plating solution at about 100° C. This solution is Niklad 794, produced commercially by Allied-Kelite Division of Witco Chemical Corporation, Los Angeles, Calif. Contacting this silver coated glass sheet with a steel part being plated in the solution initiates nickel plating on the silver coated glass sheet. The glass sheet is withdrawn from the solution and rinsed after about 20 seconds. A 2.4 cm×3.5 cm×0.2 cm piece of this glass sheet is inserted in acetylene at atmospheric pressure and a temperature of 450° C. for about 185 seconds. The measured normal reflectances of this sample are:
Wavelength (microns): 0.42; 0.50; 0.60; 0.85; 1.00; 1.20; 2.50; 12.0.
Normal Reflectance: 0.10; 0.09; 0.08; 0.10; 0.18; 0.28; 0.74; 0.94.

Comments: This sample does not have very good optical properties. Its reflectance increases too soon in the near infrared and does not rise high enough at the longer wavelengths. It is not known how much better samples can be made by varying the electroless plating conditions. Only a few samples have been made. This was the best of those formed. Not having a plating current to vary certainly reduces the amount of control one has in the formation of the catalyst layer. It is expected that electroless cobalt catalyst layers could also be formed.

The above examples are a good representation of the possibilities of this invention. These are the better samples, which consist of several hundred attempts at making good selective absorber samples.

Selective Absorbers on a Glass Substrate

Now presented are the results of a more refined study of samples having a glass substrate. Glass substrate samples seem to make the best selective absorbers, evidently because of the specularity of the glass surface. The infrared reflecting layer for these samples is either silver, as in Example 1, or electroless copper, as in Example 2, but without the alkaline copper plating. The catalyst layer is either cobalt or nickel, electoplated from dilute cobalt or nickel chloride solutions. The carbonaceous gas is acetylene at atmospheric pressure. The variables for optimization of each selective absorber are material of the infrared reflecting layer (Ag or Cu), material of said catalyst layer (Ni or Co), plating solution temperature and concentration, plating current density and time, oven temperature, and time in the oven.

The absorber samples exhibit certain characteristic properties. For sufficiently long plating times, the absorber reflectance will exhibit maxima and minima arising from interference between the reflection from the top and bottom of said carbonaceous layer. A good absorber has only one minimum, which should be adjusted to be near a wavelength of one micron, and one maximum, which should be near 0.5 microns. This adjustment is made by proper setting of the time the sample spends in the hot acetylene. However, too short a plating time leads to too much reflectance for the solar spectrum. For somewhat longer plating times the reflectance can be quite low in the blue, but increases monotonically with increasing wavelength, so that it is too high for the near infrared part of the solar spectrum. Baking times are also relatively long. Plating times only slightly longer than this lead to the best optical properties, with the appearance of a slight maximum and minimum in the low values of the solar reflectance. Further increases in plating time lead to increases in the reflectance at the interference maximum which decrease the solar absorptance. Thus, plating time and time in the hot acetylene are both adjusted, for fixed values of the other variables, to obtain approximately optimum optical properties. The range of plating times and the range of baking times which lead to a good absorber are both very limited.

Approximately 1000 glass substrate selective absorber samples have been made. The largest number of these is for samples with Ni on Ag. The normal reflectance of each sample as a function of wavelength was measured. From these measurements, there have been calculated the normal solar-mass-two absorptance (alpha: A) and the hemispherical emittance (epsilon: E) at 100° C. The Drude theory is used to calculate the hemispherical emittance from the normal reflectance. The results of these measurements and calculations are presented in FIG. 7, where the hemispherical emittance E at 100° C. and normal solar-mass-two absorptance A of the better samples of each class are shown in points in the figure. The absolute uncertainty of the values of A and E is about ±0.01. The relative uncertainty, in comparing two absorbers is perhaps ±0.003.

Figure 7:
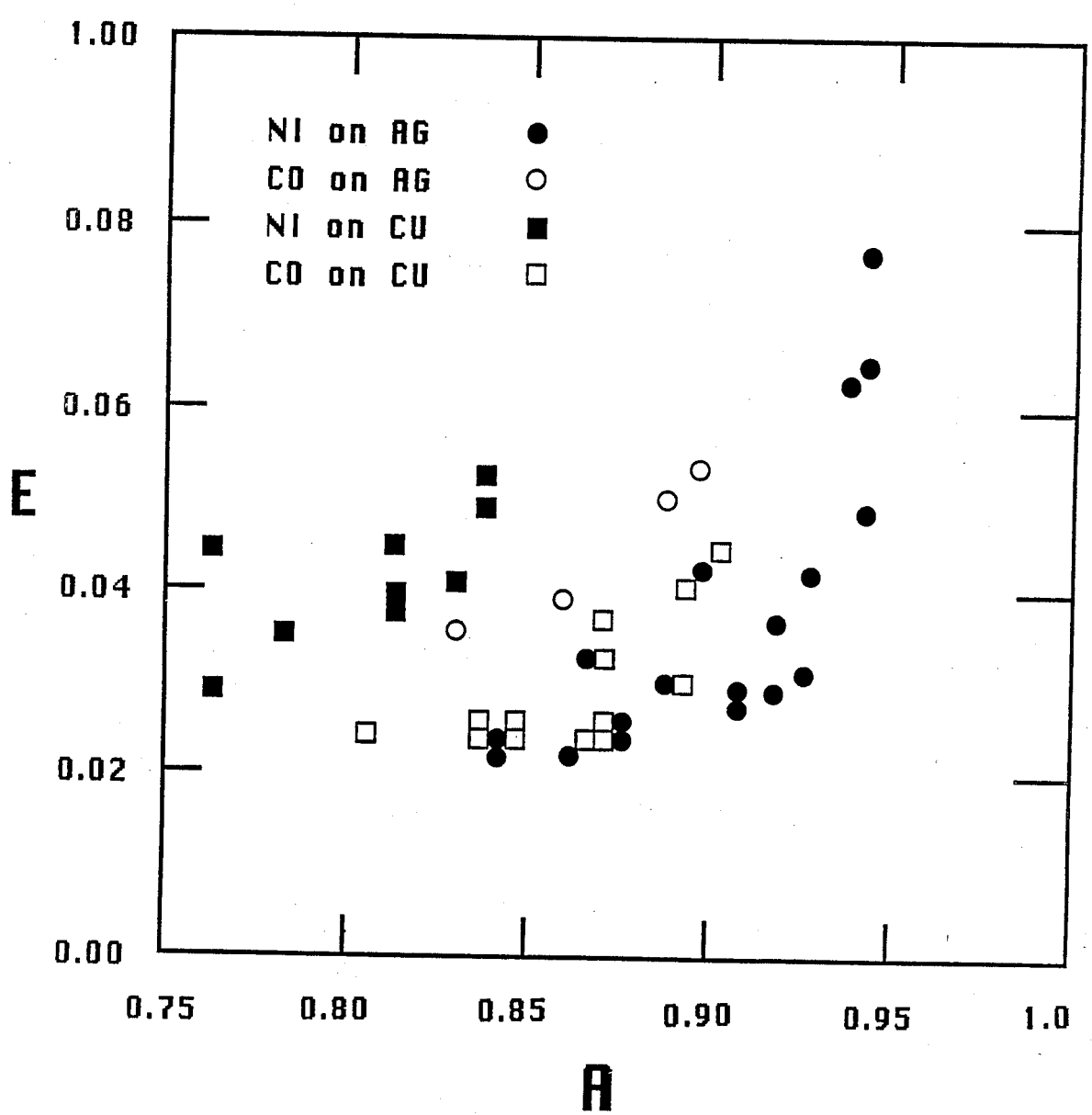
FIG. 7 is a graphical representation of the values of solar air-mass-two normal absorptance and infrared hemispherical emittance at 100° C. of a number of selected glass substrate samples.

There are four classes of selective absorbers in FIG. 7: Those using a nickel catalyst on a silver infrared reflecting layer, those using a nickel catalyst on a copper infrared reflecting layer, those using a cobalt catalyst on a silver infrared reflecting layer, and those using a cobalt catalyst on a copper infrared reflecting layer. Only a few selective absorbers using a cobalt catalyst on a silver infrared reflecting layer were formed. The principal reason for not doing more of this latter case is that cobalt does not have as good throwing power on silver. The optical properties have also not been as good as for the other absorbers, even for those cases where the plating is relatively uniform.

The selective aborbers whose absorptance and emittance are indicated in FIG. 7 have been formed under a variety of conditions. Table 2 indicates the conditions for forming some of the best samples found in FIG. 7. The additional significant figure used with values of E is included to indicate better the relative merit of the different absorbers.

TABLE 2
EXAMPLES OF SELECTIVE ABSORBERS ON GLASS

| | | | Plating | | | | Baking | | | |
|---|---|---|---|---|---|---|---|---|---|---|
| Sample | Refl. | Catal. | C gm/l | J ma/cm$^2$ | t sec | T °C. | T °C. | t sec | A | E |
| 1325T | Ag | Co | 18 | 1.5 | 30.0 | 23.8 | 535 | 265 | 0.87 | 0.033 |
| 1154U | Cu | Co | 96 | 6.3 | 3.3 | 20.7 | 460 | 214 | 0.87 | 0.027 |
| 1159T | Cu | Co | 37 | 2.8 | 4.5 | 20.6 | 475 | 217 | 0.89 | 0.030 |
| 1164T | Cu | Co | 17 | 3.0 | 5.0 | 20.7 | 475 | 280 | 0.90 | 0.045 |
| 1263B | Ag | Ni | 8 | 3.0 | 6.3 | 16.8 | 475 | 636 | 0.93 | 0.064 |
| 1256T | Ag | Ni | 8 | 8.3 | 3.9 | 27.6 | 475 | 600 | 0.93 | 0.045 |
| 1294T | Ag | Ni | 20 | 1.5 | 17.0 | 27.9 | 475 | 538 | 0.91 | 0.030 |
| 1304T | Ag | Ni | 20 | 1.5 | 14.0 | 16.9 | 475 | 550 | 0.92 | 0.031 |
| 1305T | Ag | Ni | 20 | 1.5 | 16.0 | 16.7 | 475 | 283 | 0.88 | 0.027 |
| 1322L | Ag | Ni | 8 | 3.1 | 5.2 | 6.8 | 475 | 366 | 0.88 | 0.025 |
| 1330T | Ag | Ni | 20 | 3.1 | 5.9 | 6.8 | 535 | 250 | 0.91 | 0.028 |
| 1328B | Ag | Ni | 50 | 3.1 | 8.0 | 6.7 | 535 | 196 | 0.91 | 0.029 |

Legend:
Refl. = reflector,
Catal. = catalyst,
C = concentration,
J = current density,
t = time,
T = temperature,
A = solar air-mass-two absorptance,
E = 100° C. emittance The best selective absorbers in FIG. 7 are those which have lowest hemispherical emittance E and highest normal absorptance A. It is apparent from the figure that the selective absorbers with a cobalt catalyst on a copper infrared reflecting layer and nickel on silver infrared reflecting layer are the best. The selective absorbers with a nickel catalyst on copper infrared reflecting layer and cobalt catalyst on silver infrared reflecting layer are not as good. It is believed that the relative merit of these different classes of absorbers will not be altered by forming improved samples with different plating and baking conditions.

A large number of samples have been made. However, at this time only the Ni on Ag samples have been studied systematically with a large enough number of samples to approach a good optimization of the optical properties of this particular kind of absorber. Approximately 600 samples of this class have been made.

For this class of absorbers it is found that, in the range of variables which makes good selective absorbers, A increases and the selectivity ratio A/E decreases with increasing current density and with increasing plating solution temperature. It appears that A also increases and A/E decreases somewhat with increase in baking temperature. It is also found that the plating time required for absorber samples with the best optical properties (A and E) decreases as the plating solution concentration decreases and as the solution temperature decreases. In addition, a plating solution concentration of 50 gm/l $NiCl_2$ or above does not make selective absorbers with good optical properties at 28° C. with a current density of 1.5 ma/cm$_2$, but a concentration of 50 gm/l makes a sample with good optical properties with a current density of 1.5 ma/cm$^2$ at a solution temperature of 17° C., and better at 7° C., for example. As another example, a change in the plating time of Sample 1330T (See Table 2) from 5.9 seconds to 5.5 seconds can approximately double E, and increase the baking time, while lowering the absorptance somewhat (assuming baking time is approximately optimum). Increasing the plating time above 5.9 seconds will lower both the emittance and absorptance. Above about 7 seconds, the absorptance gets lighter with little improvement in emittance. Similar behavior is exhibited by the other samples. The range of variables which make good absorbers is limited.

Earlier studies have shown that silver tends to agglomerate at temperatures as low as 250° C. The silver films studied were formed by chemical vapor deposition. We have observed no tendency for agglomeration of silver which is chemically deposited on glass by the method used here, either in this work or in an earlier work (J. Garrison U.S. Pat. No. 4,228,220), at least in its effect on optical properties of the absorber.

Apparatus for Selective Absorber Formation

Uniform electroplating of said catalyst layer on tubes, sheets, ot tube networks with glass substrate is not easily accomplished by simultaneously plating all of a tube, sheet, or tube network. The conducting metallic layer on the surface of the glass, which serves as the infrared reflecting layer, is too thin. This causes a drop in the voltage over the length of the tube, sheet, or tube network, which can lead to non-uniform current density over the surface being plated, unless the plating electrodes are suitably formed. Besides carefully forming the plating electrodes, uniform plating can be achieved by forming an electrode which limits its plating to a strip on the sheet or band around the tube or tubes. The electrode is then made to traverse the length of the surface being plated at uniform speed and constant current.

The carbon containing gas used in the formation of said carbonaceous layer will usually be flammable and possibly toxic. Containment within the fabricating apparatus and no exposure to air while above the spontaneous ignition temperature is necessary. The gas can be mixed with air after use in absorber formation, when cooled sufficiently if, as below for the conveyer oven, the gas is subsequently burned to provide heat for the pyrolysis of said carbon containing gas.

Figure 8:
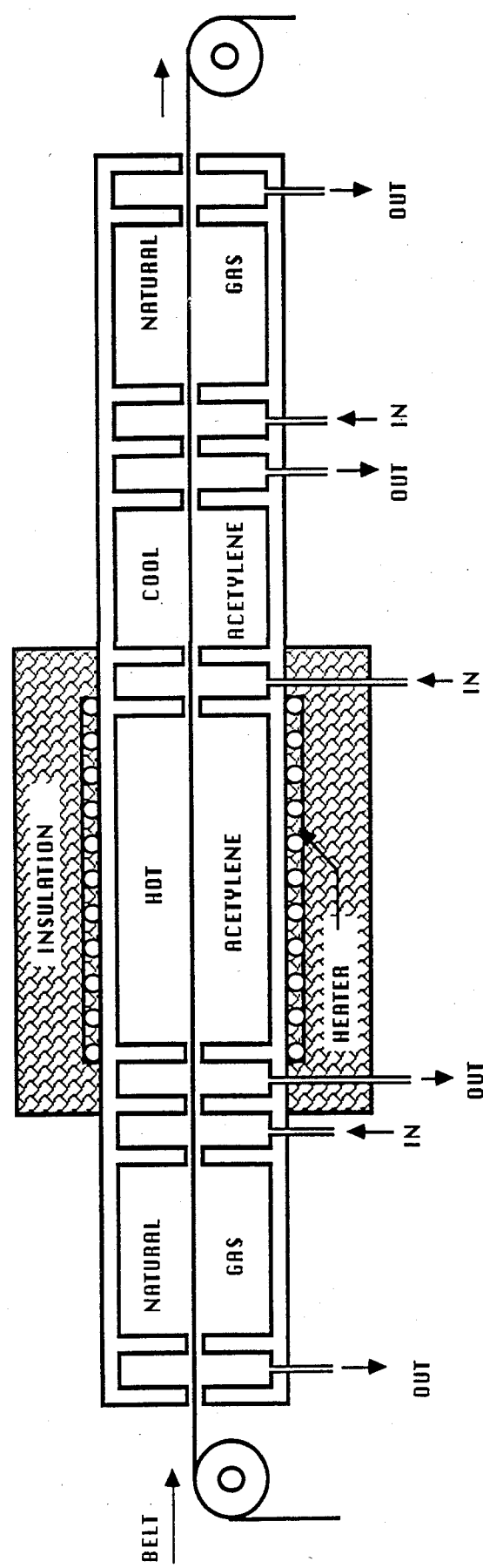
FIG. 8 is a diagrammatic representation of the essential features of a conveyer oven for forming the carbonaceous absorbing layer.

One embodiment of our apparatus for forming said carbonaceous layer is a conveyer oven, as indicated schematically in FIG. 8. This apparatus could be used in coating tubes, tube networks or sheets, for example. An oven of this type has been constructed and its usefulness for the formation of selective absorbers demonstrated.

Another preferred method includes batch processing in a sealed oven, from which air is evacuated prior to the introduction of the carbon containing gas. A limited vacuum, with pressure less than, or of the order of, a few hundred microns, such as achieved by a simple mechanical pump, provides adequate air removal. Ovens of this type are commercially available. A laboratory tube oven and vacuum system has been used to demonstrate formation of selective absorber samples by this process. Absorber formation in the laboratory by this means can be done in such a manner as to simulate the conveyer oven process.

In order to form the carbonaceous layers in a reasonable length of time, sufficient heat must be applied to both the carbon containing gas and to the catalyst layer to raise the temperature to the desired level. Heated said catalyst layer can serve to heat the gas. There are a number of ways of achieving proper heat, including infrared and bright light sources, lasers, induction heating, etc., and including many commercially available heating devices. The heat source used to form these absorbers should not be deemed limited to the devices discussed above.

What I claim is:

1. A method of constructing a solar selective absorber, comprising the steps of:
    (a) depositing an infrared reflecting layer on a substrate;
    (b) depositing a catalyst layer on said infrared reflecting layer; and
    (c) depositing a carbonaceous layer on said catalyst layer by exposing said catalyst layer to a carbon containing gas compound at temperatures in the range of from 250° to 550° C.

2. The method recited in claim 1, wherein said infrared reflecting layer is a metal selected from the group consisting of copper, silver and aluminum.

3. The method recited in claim 1, wherein said catalyst layer is a metal selected from the group consisting of nickel, cobalt, copper, palladium and platinum.

4. The method of claim 1, wherein said substrate is a material selected from the group consisting of metal, glass and ceramic.

5. The method of claim 1, wherein said carbon containing gas is a gas selected from the group consisting of acetylene, ethylene, Mapp gas, butane and propane.

6. The method of claim 1, wherein the depositing of said catalyst layer comprising electroplating, using solutions having a metal salt concentration in the range of 3 to 350 grams per liter.

7. The method of claim 6, wherein the plating solution temperature is in the range of 0° to 100° C., and the plating current density is in the range of 0.50 to 10 milliamperes per square centimeter.

8. The method of claim 1, wherein said substrate is glass.

9. A method of constructing a solar selective absorber, comprising the steps of:
    (a) depositing a catalyst layer on an infrared reflecting substrate; and
    (b) depositing a carbonaceous layer on said catalyst layer by exposing said catalyst layer to a carbon containing gas compound at temperatures in the range of from 250° to 500° C.

10. The method recited in claim 9, wherein said catalyst layer is a metal selected from the group consisting of nickel, cobalt, copper, palladium and platinum.

11. The method of claim 9, wherein said carbon containing gas is a hydrocarbon.

12. The method of claim 9, wherein said carbon containing gas is selected from the group consisting of acetylene, ethylene, Mapp gas, butane and propane.

13. A solar selective absorber of the type having a normal solar air-mass-two absorptance of greater than about 0.75 and hemispherical emittance at 100° C. of less than about 0.25 for selectively absorbing solar radiation in the range of about 0.3 to 2.0 microns while substantially reflecting infrared radiation and thus having low infrared emittance so that the heat loss after collection is minimized, comprising:
    (a) a substrate;
    (b) an infrared reflecting layer deposited on said substrate, said infrared reflecting layer having sufficient thickness to substantially prevent the transmission of light having wavelengths greater than 0.4 microns, and having a reflectance greater than 90 percent for infrared wavelengths greater than 1.0 micron;
    (c) a catalyst layer deposited on said infrared reflecting layer said catalyst layer having a thickness of the order of 0.01 to 0.1 micron, and being a metal selected from the group consisting of group VIII metals and copper, for catalyzing the formation of carbon; and
    (d) a carbonaceous layer pyrolytically deposited on said catalyst layer, said carbonaceous layer having a thickness of the order of 0.01 to 0.10 microns.

14. An improved solar selective absorber of the type in which
    a thin absorptive layer, for absorbing solar radiation, is deposited on a base structure which includes a substrate for structural length and means for infrared reflectance,
wherein the improvement comprises
    the upper surface of said base structure including a means for catalyzing the pyrolytic decomposition of a carbon containing gas, and a carbonaceous layer catalytically deposited thereon to serve as the thin absorptive layer for absorbing solar radiation, said improved selective absorber having a solar air-mass-two absorptance of greater than about 0.75 and a hemispherical emittance at 100° C. of less than about 0.25 for selectively absorbing solar radiation in the wavelength range of about 0.3 to 2.0 microns while substantially reflecting infrared radiation of wavelengths greater than about 2.0 microns and thus having low infrared emittance so that the heat loss after collection is reduced.

15. The invention of claim 14, wherein said carbon containing gas is a hydrocarbon.

16. The invention of claim 14, wherein said carbonaceous layer is formed in a conveyer oven at near atmospheric pressure.

17. The improved solar selective absorber of claim 14, wherein
   (a) said infrared reflectance means includes an infrared reflecting layer deposited on said substrate;
   (b) said catalyzing means includes a catalyst layer deposited on said infrared reflecting layer; and
   (c) said carbonaceous layer is deposited on said catalyst layer.

18. The improved solar selective absorber of claim 14, wherein
   (a) said infrared reflectance means is provided by said substrate material;
   (b) said catalyzing means includes a catalyst layer deposited on said substrate; and
   (c) said carbonaceous layer is deposited on said catalyst layer.

19. The improved solar selective absorber of claim 14, wherein
   (a) said infrared reflectance means includes an infrared reflecting layer deposited on said substrate;
   (b) said catalyzing means are provided by said infrared reflecting layer material; and
   (c) said carbonaceous layer is deposited on said infrared reflecting layer.

20. The improved solar selective absorber of claim 14, wherein
   (a) said infrared reflectance means and said catalyzing means are provided by said substrate material; and
   (b) said carbonaceous layer is deposited on said substrate.

21. The invention of claim 14, wherein said catalyzing means are provided by a metal selected from the group VIII metals.

22. The invention of claim 14, wherein said catalyzing means are provided by cobalt or nickel.

23. The invention of claim 14, wherein said catalyzing means are provided by copper.

24. The invention of claim 14, wherein said carbon containing gas is acetylene.

25. An improved solar selective absorber of the type having a normal solar air-mass-two absorptance of greater than about 0.75 and a hemispherical emittance at 100° C. of less than about 0.25 for selectively absorbing solar radiation in the range of about 0.3 to 2.0 microns while substantially reflecting infrared radiation of wavelengths greater than about 2.0 microns and thus having low infrared emittance so that heat loss after collection is reduced, comprising:
   (a) an infrared reflecting substrate, said infrared reflecting substrate having sufficient thickness for structural strength and to substantially prevent the transmission of light having wavelengths greater than 0.4 microns, and having a reflectance greater than 90% for infrared wavelengths greater than 1.0 micron;
   (b) a catalyst layer deposited on said infrared reflecting substrate, said catalyst layer having a thickness of the order of 0.01 to 0.1 microns, and being of a metal selected from the group consisting of group VIII metals and copper, for catalyzing the formation of carbon; and
   (c) a carbonaceous layer pyrolytically deposited on said catalyst layer.

26. An improved solar selective absorber of the type having a normal solar air-mass-two absorptance of greater than about 0.75 and a hemispherical emittance at 100° C. of less than about 0.25 for selectively absorbing solar radiation in the wavelength range of about 0.3 to 2.0 microns while substantially reflecting infrared radiation of wavelengths greater than 2.0 microns and thus having low infrared emittance so that heat loss after collection is reduced, comprising:
   (a) a substrate;
   (b) an infrared reflecting catalyst layer deposited on said substrate, said infrared reflecting catalyst layer having sufficient thickness to substantially prevent the transmission of light having wavelengths greater than 0.4 microns, and having a reflectance greater than 90% for wavelengths greater than 1.0 micron, said infrared reflecting catalyst layer being a metal selected from the group consisting of group VIII metals and copper for catalyzing the formation of carbon; and
   (c) A carbonaceous layer pyrolytically deposited on said infrared reflecting catalyst layer.

27. An improved solar selective absorber of the type having a normal solar air-mass-two absorptance of greater than about 0.75 and a hemispherical emittance at 100° C. of less than about 0.25 for selectively absorbing solar radiation of wavelengths in the range of about 0.3 to 2.0 microns while substantially reflecting infrared radiation of wavelengths greater than 2.0 microns and thus having low infrared emittance so that heat loss after collection is reduced, comprising:
   (a) an infrared reflecting catalyst substrate, said infrared reflecting catalyst substrate having sufficient thickness for structural strength and to substantially prevent the transmission of light having wavelengths greater than 0.4 microns, and having a reflectance greater than 90% for infrared wavelengths greater than 1.0 micron, said infrared catalyst substrate being a metal selected from the group consisting of group VIII metals and copper, for the formation of carbon; and
   (b) a carbonaceous layer pyrolytically deposited on said infrared reflecting catalyst substrate.

* * * * *